United States Patent
Frost

(10) Patent No.: US 6,389,736 B1
(45) Date of Patent: *May 21, 2002

(54) FISHING BOBBER WITH SHIFTING CENTER OF GRAVITY

(76) Inventor: Gary L. Frost, 4461 S. 150 East, Ogden, UT (US) 84405

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/508,673

(22) Filed: Jul. 28, 1995

(51) Int. Cl.[7] .............................................. A01K 93/00
(52) U.S. Cl. ..................................................... 43/44.87
(58) Field of Search .............................. 43/43.14, 43.1, 43/44.87, 44.88, 42.31

(56) References Cited

U.S. PATENT DOCUMENTS

| | | | |
|---|---|---|---|
| 2,772,504 A | * 12/1956 | Zerante | |
| 3,323,247 A | * 6/1967 | Murray | 43/44.87 X |
| 3,461,596 A | * 8/1969 | Green | 43/43.14 X |
| 3,688,431 A | * 9/1972 | Nichols et al. | 43/43.14 |
| 3,757,453 A | * 9/1973 | Therres | 43/43.14 |
| 3,820,270 A | * 6/1974 | La Force | 43/43.14 |
| 3,866,346 A | * 2/1975 | Schneider | 43/44.87 |
| 3,990,172 A | * 11/1976 | Hagquist | 43/43.14 |
| 4,817,326 A | * 4/1989 | Benjestorf | 43/43.1 |
| 4,845,885 A | 7/1989 | Rubbelke | 43/95 |
| 5,231,787 A | * 8/1993 | Chuang | 43/43.1 |
| 5,412,902 A | * 5/1995 | Hicks | 43/44.87 |

FOREIGN PATENT DOCUMENTS

AU 286106 * 10/1966

* cited by examiner

Primary Examiner—Joseph J. Hail, III
(74) Attorney, Agent, or Firm—Mallinckrodt & Mallinckrodt; Brian R. Rayve

(57) ABSTRACT

A fishing bobber design of elongate construction, having internal unattached rolling weights, so that the bobber will remain in stable horizontal position or in stable vertical position upon the body of water. The nibble of a fish upon the bait tips the bobber from stable horizontal position to a very noticeable stable vertical position, in which it remains until again placed into the stable horizontal position upon the water.

4 Claims, 3 Drawing Sheets

FISHING BOBBER WITH SHIFTING CENTER OF GRAVITY

BACKGROUND OF THE INVENTION

1. Field

This invention relates to bobbers for attachment to fishing lines, and pertains more particularly to a bobber incorporating a shifting weight so that the bobber itself shifts from horizontal to vertical position when a fish exerts a pull on the attached bait line.

2. State of the Art

Floating fishing bobbers have been long used, serving the dual functions of suspending a bait laden hook a desired distance below the surface of the water, and of providing visual indication of the presence of a fish taking the bait. Large fish may take both hook and bait into their mouths and tug to completely sink the bobber, which provides an unquestionable notice of the fish's presence. Smaller fish may only nibble at the bait on the hook, causing only a minor, perhaps unnoticed response of the bobber. In the latter event, especially if the bobber is distant from the angler, the presence of the fish may go undetected. Fishing is touted as, and is in reality among the most relaxing of avocations, accompanied by drowsiness and the lack of alert perceptivity needed to notice small bobber disturbances. Small disturbances may even when seen be attributed to gentle waves and breezes rather than to the fish.

Several fishing bobbers have been designed to shift position upon the water when the bait line is tugged. U.S. Pat. No. 3,323,247, comprises a hollow floating ball with an extending stem attached oppositely to the point of fishing line connection. At rest, this bobber reclines upon the surface of the water. The reclining position of the stem upon the surface of the water is maintained by a small float positioned outwardly on the stem. Strong tugs upon the baited hook rotates the ball, raising the stem into the air. Smaller tugs might also alert the angler, the stem then partially rising and falling. The bobber response is largely proportional to the strength of the tug upon the bait line, ranging from small upward motions of the stem to movement to a directly upright position of the stem. After the fish has left, if not hooked, the bobber, because of unstable equilibrium resulting from the center of buoyancy being below the center of gravity, immediately assumes its original reclining position with the stem lying along the water. If the angler's attention wanders and the fish successfully takes the bait without being hooked, the angler may unknowingly continue to fish with a baitless hook.

U.S. Pat. No. 4,300,304 discloses a hollow floating ball with an extending rod called a "nibbler stick". The principle of operation is very similar to the previously discussed design. The nibbler stick provides improved noticeability by multiplying the motion of the ball. As with the preceding design, the bobber assembly is stable only with the extending stem lying along the water surface. U.S. Pat. No. 4,845,885 discloses a bobber assembly including a heavy central washer of metallic or other dense material at the center of a hollow bulbous body. A stem extends oppositely to the point of attachment of the fishing line and the baited hook line. The weight in this location causes the bobber assembly to float in stable horizontal position. A tug by a fish unbalances the bobber equilibrium, rotating it to a vertical position. Should the fish abandon the bait on the hook, or detach it without being hooked, the bobber then assumes a stable horizontal position upon the water, perhaps with a baitless hook.

Clearly, there remains a need for a floating fish bobber which changes it position markedly upon a tug by a fish upon an attached bait line, and does not automatically return to its original position upon the water when the tug is ended for any reason.

BRIEF SUMMARY OF THE INVENTION

With the foregoing in mind, the present invention eliminates or substantially alleviates the foregoing disadvantages and drawbacks in prior art fishing bobber designs. A bulbous, hollow, preferably ellipsoid floating body carries provisions for attaching a fishing line and a hook and bait line at one end of the ellipsoid major axis. An elongate stem extends from the opposite end of the major axis.

Included unattached within the bulbous member are one or more relatively heavy objects, rounded to roll or slide freely. Spheroids of steel or other dense material are preferred. The location of the center of gravity of the bobber is dominated by the massive objects, which gravitate to the lowest point within the bulb, placing said center well below the center of buoyancy of the bobber.

The bobber is initially placed reclining in stable equilibrium on the water with the stem lying horizontal and the rolling weights clustered at near the horizontal center of the bulb.

When the bait is struck by a fish, the bait line end of the bulb is tilted downwardly, causing the weights to roll unimpeded to that end. This shifts the center of gravity of the bobber, creating an unbalanced force couple between the downward directed weight of the bobber and the upward buoyancy force of the water. This rotates the bobber into a stable vertical position with buoyant and gravity forces vertically aligned.

The rolling weights provide great sensitivity to even the slightest of tugs, which are sufficient to completely change the position of the bobber from horizontal to vertical. This very visible noticeable vertical position is stable also, and is maintained whether the fish has been hooked, has stolen the bait, or has lost interest and departed. The prudent angler is then alerted to withdraw the line and bobber to check the hook for bait.

The mass of the rolling weights helps the angler to accurately cast bobber and bait to desired locations on the water. To restore the upright bobber to horizontal position requires only a gentle tug upon the fishing line by the angler. This tilts the bobber sufficiently for the weights to roll toward the midplane of the bulb, restoring the bobber to stable horizontal position upon the water, with gravity and buoyant forces again vertically aligned. The bobber remains stably in either upright or horizontal position, because the mass of the weighty objects forces the center of gravity to always be below the center of buoyancy of the bobber in the water. The sensitivity of the bobber to small tugs on the bait line is greatly increased by the automatic rapid shifting of the center of gravity away from the center of buoyancy, adding to the force couple tipping the bulb toward the upright stable position.

It is therefore the principal object of the invention to provide an improved fishing bobber, wherein the tug of a fish upon the bait changes the attitude of the bobber assembly from a flat position on the surface of the water to an upright one, said position being maintained as long as the angler desires. A further objective is to provide a fishing bobber of increased sensitivity to small tugs upon the baited hook.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
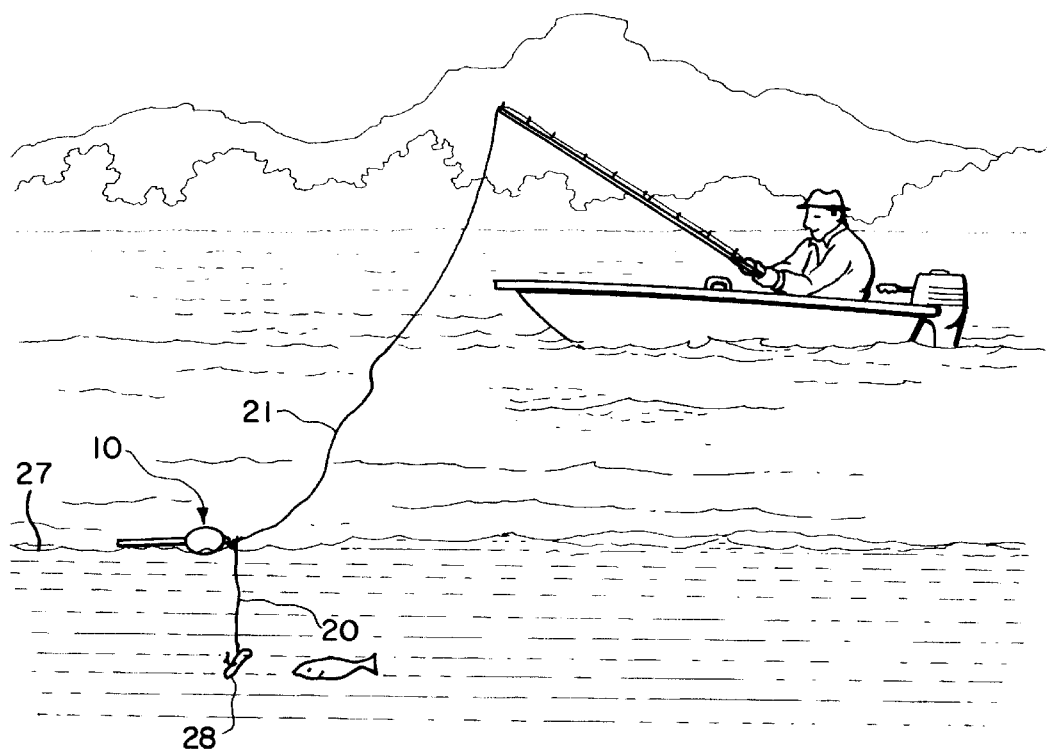
FIG. 1 is a view of a bobber in accordance with the invention in use upon a body of water being fished, FIG. 2 a side elevation view of the bobber of FIG. 1 reclining horizontally upon the body of water, drawn to substantially full scale, FIG. 3 a view of the bobber of FIG. 2 tipped into vertical position upon the body of water by the tug of a fish upon the bait leader line, drawn to the scale of FIG. 2, FIG. 4 a cross sectional view of the bobber of FIG. 2 taken along line 4—4 thereof, FIG. 5 a view of the bobber being restored to horizontal position upon the surface of the water by a tug upon the fishing line, drawn to the scale of FIG. 2, FIG. 6 a view of another embodiment in accordance with the invention, resting horizontally upon the water, drawn to a reduced scale, and FIG. 7 a view of the embodiment of FIG. 6, in stable vertical position upon the water, drawn to the same scale.

In FIG. 1, a fishing bobber 10 in accordance with the invention is illustrated in use, lying horizontally on the surface of the body of water being fished, attached to fishing line 21 and carrying a hook 29 with bait 28.

Figure 2:
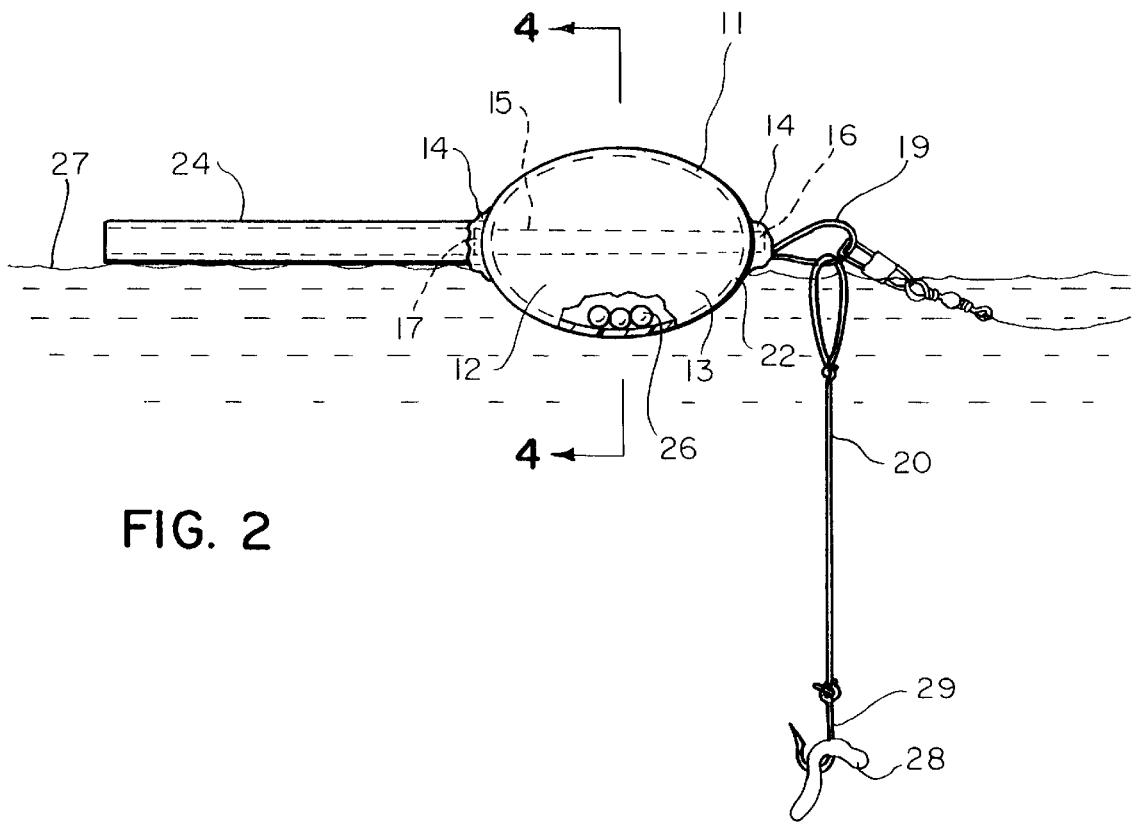
Figure 3:
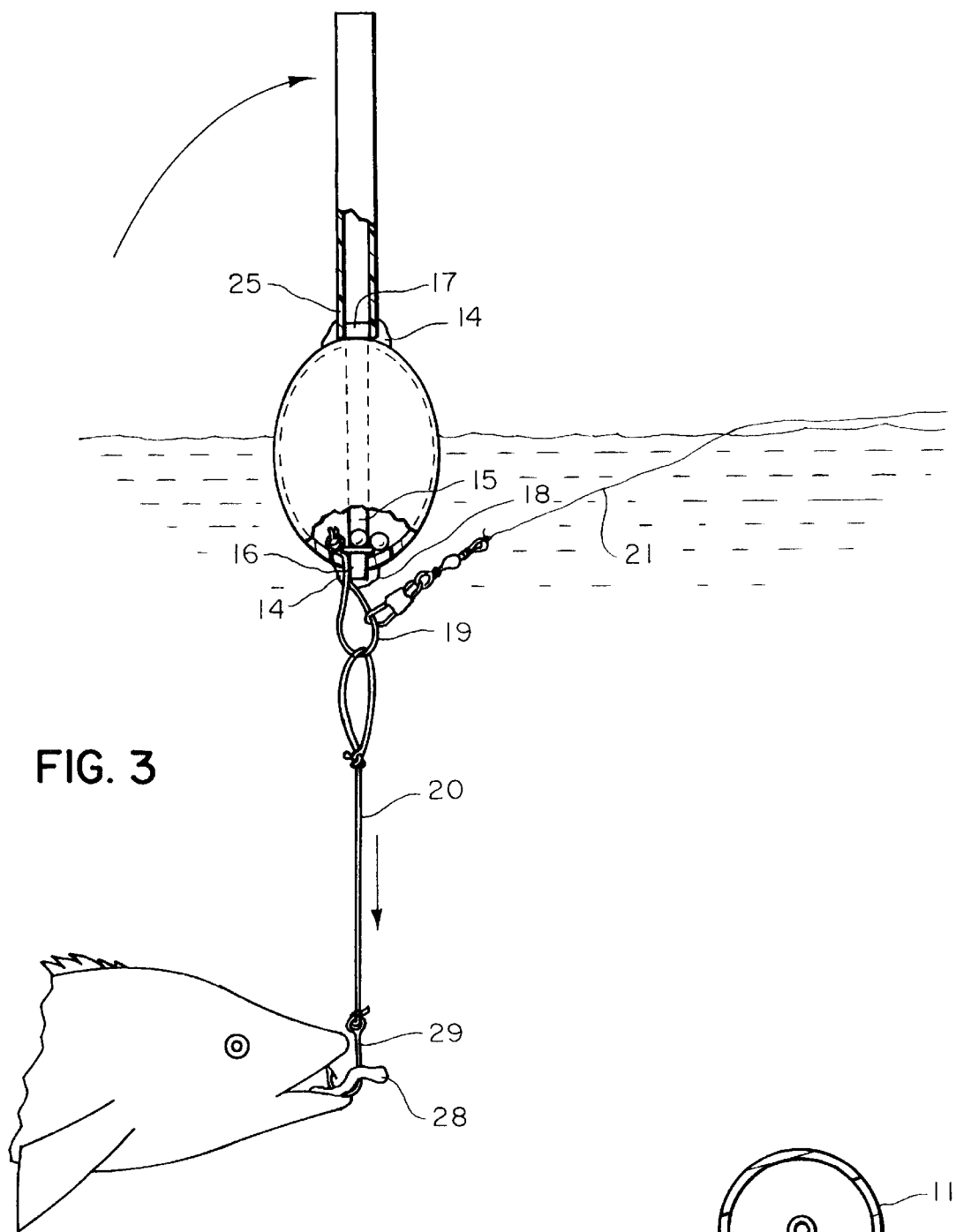
Figure 4:
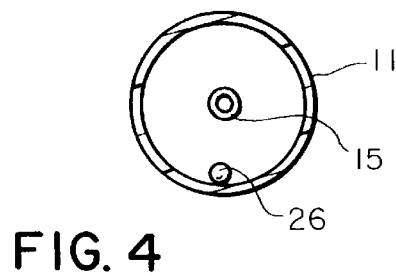

Bobber 10 as illustrated comprises an ellipsoidal hollow flotation body 11 comprising two hemiellipsoids 12 and 13 joined as by waterproof epoxy 14. (FIG. 2) A central tubular strengthening member 15 further joins the two hemiellipsoids, the epoxy 14 forming watertight seals around the protruding stub ends 16 and 17. (FIGS. 3 and 4) At one end of central tube 15 is a plug 18 of the epoxy, securing an open loop 19 as of nylon filament, to which may be secured both a hook and bait leader line 20 and a fishing line 21.

The epoxy potting material 14 of plug 18 for loop 19 also seals the central tube 15 and the bait end 22 of body 11 against entry of water. At the opposite end 23 of body 11 is an elongate extended stem 24, illustrated as being of plastic tubing selected to fit around stub end 17 of central tube 15. The juncture of stub end 17 and the mating end 25 of extending tube 24 and the end 23 of body 11 are potted with the epoxy 14 to be waterproof, so that no water is able to enter into the interior of body 11.

Placed within but unattached to hollow body 11 are three freely rolling copper coated steel spheres 26. Although small in volume compared to the bobber 10, the combined weight of the group of spheres 26 is sufficient to cause the center of gravity of bobber 10 to always be nearby. The weights roll together to the lowest point in hollow body 11, so that bobber 10 is stable when placed into either a horizontal or an upright position upon the water.

The spheres 26 are rolled together into a group at the bottom side of body 11 when the bobber 10 is lying horizontally upon the surface 27 of the water, seeking the lowest place to come to rest. However, downward tugs on bait 28 upon hook 29 causes bait leader 20 to tip body 11 toward a vertical position. Body 11 rotates in response to a force couple provided by downward tension in bait leader 20 and the upward buoyant force of the water centered near the middle of said body. The tilting rolls the steel spheres 26 toward bait end 22, further propelling body 11 toward a vertical position. (FIG. 3) With steel spheres 26 now grouped by gravity at bait end 22 of now vertical body 11, the center of gravity is again aligned directly below the center of buoyancy and bobber 10 remains in stable upright position. It will remain so even though the fish is not hooked and has departed the vicinity. After noting the upright position of bobber 10, the angler may withdraw it to inspect the hook and bait.

Figure 5:
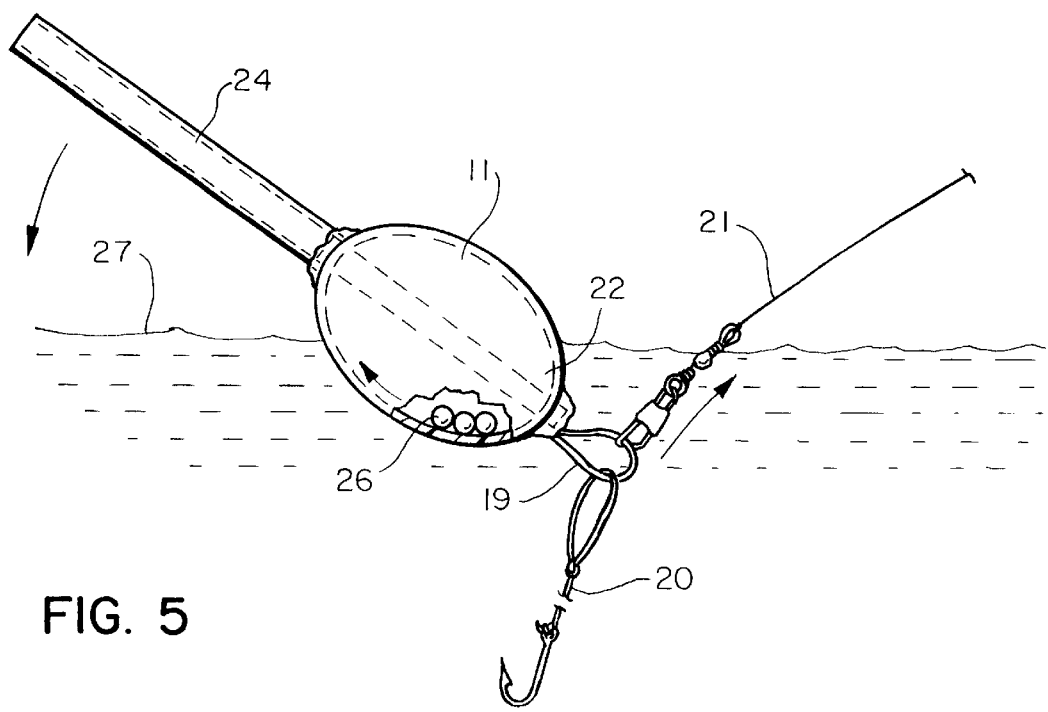

When bobber 10 is vertical, after casting or from a nibbling fish, it is restored to horizontal position by a tug upon fishing line 21 by the angler. This upsets body 11 and the steel spheres roll to the center position, and bobber 10 again reclines in stable horizontal position. (FIG. 5)

The bobber assembly having free rolling weights 26 is extremely sensitive to small tugs upon the bait leader 20. This is because the slightest tilting of body 11 from the horizontal position causes the spheres to roll toward the leader attaching end, shifting the center of gravity and multiplying the tipping moment upon the bobber. Other bobber designs which do not have shifting centers of gravity are not so sensitive.

Figure 6:
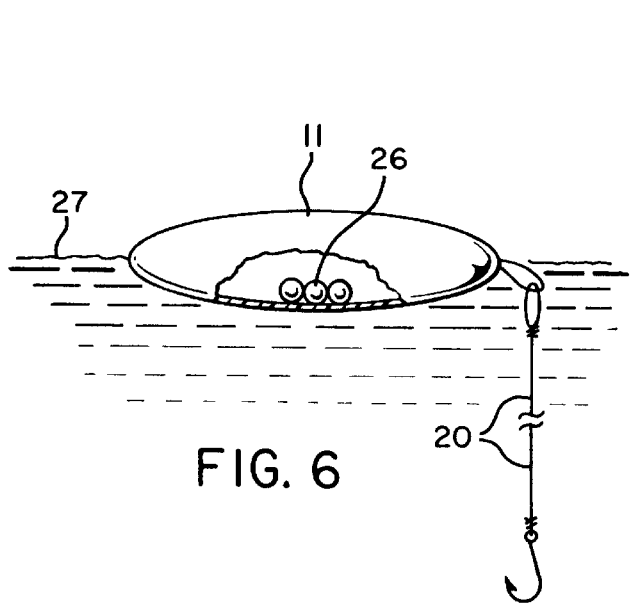
Figure 7:
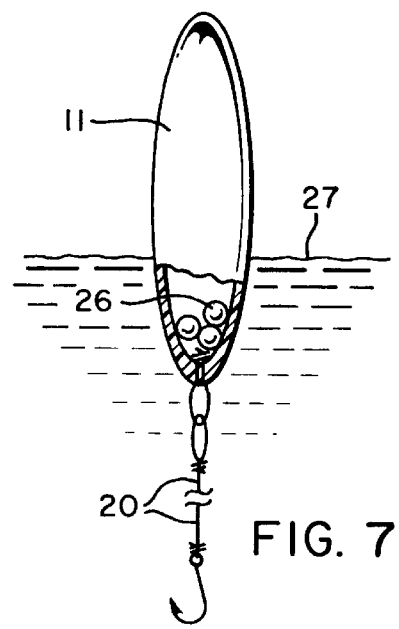

Other embodiments than that illustrated may be within the spirit of the invention. For example, the shape of the floating bulb can be varied from the ellipsoidal shape illustrated for body 11. It need not necessarily be elongate as shown nor symmetrical about a central plane as illustrated. Other configurations would be also functional, so long as the shape provided for two locations to which the rolling weights 26 would gravitate, one location being associated with bobber 10 in stable horizontal position and the other with bobber 10 in stable vertical position. Thus, the use of spherical shapes is not precluded, nor are pear shapes, nor polygonal configurations, for example. The illustrated bulb and stem configuration of bobber 10 has certain unmistakeable advantages, including great stability in the reclining horizontal position on the water, and great noticeability in the erect, vertical position. With this configuration, bulb shapes are not highly critical, as stated above. However, the stem is not an essential part of the bobber 10 configuration. For example, a stemless, slender ellipsoid bulb would, with the enclosed rolling spheroids, be stable in both horizontal and vertical positions upon the water. (FIGS. 6 & 7)

The invention may be embodied in still other specific forms without departing from the spirit or essential characteristics thereof. The present embodiments are, therefore, to be considered as illustrative and not restrictive, the scope of the invention being indicated by the appended claims rather than by the foregoing description and all changes that come within the meaning and range of equivalency of the claims are therefore intended to be embraced therein.

What is claimed and desired to be secured by United States Letters Patent is:

1. A fishing bobber for attachment to a fishing line and to a hook and bait leader line, which fishing bobber floats on the surface of a body of water, comprising:

a generally hollow buoyant bulbous body of generally spherical shape having a generally concave curved inner surface and a pair of opposed ends connected by an axis;

means for attaching the fishing line and the hook and bait leader line to one of the ends of said body at said axis;

at least one object of high density material unattached within and free to move along said inner surface of said body under the influence of gravity;

an elongate central member disposed along the axis of the body and having a pair of opposite ends, each of said opposite ends being secured to one of the ends of said body, the end of the central member disposed opposite the attaching means extending through a hole in said body;

an elongate stem comprising plastic tubing which is affixed to and protrudes from the end of said body opposite said attaching means, aligned with the axis of said body, being of such size as to closely fit over and which is affixed to said one end of said central member extending through said hole, permitting greater visual perception of the position in which the fishing bobber is floating; and wherein the fishing bobber floats in a stable position upon the surface of the body of water with the fishing line and the hook and bait leader line attached thereto, when placed in a first position with said axis substantially horizontal and wherein when the hook and bait leader line is tugged by a fish striking bait attached thereto, said end of said body to which the fishing line and the hook and bait leader line is attached is tilted downwardly causing said at least one object to move along said inner surface of said body to said end placing the fishing bobber in a second position with said axis substantially vertical.

2. A fishing bobber for attachment to a fishing line and to a hook and bait leader line, which fishing bobber floats on the surface of a body of water, comprising:

a generally hollow buoyant bulbous body having a generally concave curved inner surface and a pair of opposed ends connected by an axis, said body being elongated in the direction of said axis;

means for attaching the fishing line and the hook and bait leader line to one of the ends of said body at said axis;

at least one object of high density material unattached within and free to move along said inner surface of said body under the influence of gravity;

an elongate central member disposed along the axis of the body and having a pair of opposite ends, each of said opposite ends being secured to one of the ends of said body, the end of the central member disposed opposite said attaching means extending through a hole in said body;

an elongate stem comprising plastic tubing which is affixed to and protrudes from the end of said body opposite said attaching means, aligned with the axis of said body, being of such size as to closely fit over and which is affixed to said one end of said central member extending through said hole, permitting greater visual perception of the position in which the fishing bobber is floating; and wherein the fishing bobber floats in a stable position upon the surface of the body of water with the fishing line and the hook and bait leader line attached thereto, when placed in a first position with said axis substantially horizontal and wherein when the hook and bait leader line is tugged by a fish striking bait attached thereto, said end of said body to which the fishing line and the hook and bait leader line is attached is tilted downwardly causing said at least one object to move along said inner surface of said body to said end placing the fishing bobber in a second position with said axis substantially vertical.

3. A fishing bobber for attachment to a fishing line and to a hook and bait leader line, which fishing bobber floats on the surface of a body of water, comprising:

a generally hollow buoyant body of generally spherical shape having a pair of opposed ends connected by an axis;

means for attaching the fishing line and the hook and bait leader line to one of the ends of said body at said axis;

at least one object of high density material unattached within and free to move throughout said body under the influence of gravity;

an elongated central member disposed along the axis of said body and having a pair of opposite ends, each of said opposite ends being secured to one of the ends of said body, the end of the central member disposed opposite said attaching means extending through a hole in said body;

an elongate stem comprising plastic tubing which is affixed to and protrudes from the end of said body opposite said attaching means, aligned with the axis of said body, being of such size as to closely fit over and which is affixed to the end of said central member extending through said hole, permitting greater visual perception of the position in which the fishing bobber is floating; and wherein the fishing bobber floats in a stable position upon the surface of the body of water with the fishing line and the hook and bait leader line attached thereto, when placed in a first position with said axis substantially horizontal and when placed in a second position with said axis substantially vertical.

4. A fishing bobber for attachment to a fishing line and to a hook and bait leader line, which fishing bobber floats on the surface of a body of water, comprising:

a generally hollow buoyant body having a pair of opposed ends connected by an axis, said body which is elongated in the direction of said axis;

means for attaching the fishing line and the hook and bait leader line to one of the ends of said body at said axis;

at least one object of high density material unattached within and free to move throughout said body under the influence of gravity;

an elongate central member disposed along the axis of said body and having a pair of opposite ends, each of said opposite ends being secured to one of the ends of said body, the end of the central member disposed opposite said attaching means extending through a hole in said body;

an elongate stem comprising plastic tubing which is affixed to and protrudes from the end of said body opposite said said attaching means, aligned with the axis of said body, being of such size as to closely fit over and which is affixed to the end of said central member extending through said hole, permitting greater visual perception of the position in which the fishing bobber is floating; and wherein the fishing bobber floats in a stable position upon the surface of the body of water with the fishing line and the hook and bait leader line attached thereto, when placed in a first position with said axis substantially horizontal and when placed in a second position with said axis substantially vertical.

* * * * *